United States Patent
Mujumdar (10) Patent No.: US 11,541,875 B2
(45) Date of Patent: Jan. 3, 2023

(54) SYSTEM AND METHOD FOR PATH PLANNING IN VEHICLES

(71) Applicant: Aptiv Technologies Limited, St. Michael (BB)

(72) Inventor: Tapan R. Mujumdar, Kokomo, IN (US)

(73) Assignee: APTIV TECHNOLOGIES LIMITED

(*) Notice: Subject to any disclaimer, the term of this patent is extended or adjusted under 35 U.S.C. 154(b) by 95 days.

(21) Appl. No.: 16/906,736

(22) Filed: Jun. 19, 2020

(65) Prior Publication Data
US 2021/0394745 A1   Dec. 23, 2021

(51) Int. Cl.
*B60W 30/045* (2012.01)
*B60W 30/18* (2012.01)
*B60W 40/072* (2012.01)

(52) U.S. Cl.
CPC .... *B60W 30/045* (2013.01); *B60W 30/18145* (2013.01); *B60W 40/072* (2013.01); *B60W 2552/05* (2020.02); *B60W 2552/30* (2020.02)

(58) Field of Classification Search
None
See application file for complete search history.

(56) References Cited

U.S. PATENT DOCUMENTS

| | | | |
|---|---|---|---|
| 7,010,412 B1 * | 3/2006 | Song | G09B 25/06 404/1 |
| 7,469,765 B2 | 12/2008 | Spannheimer et al. | |
| 8,099,214 B2 | 1/2012 | Moshchuk et al. | |
| 8,712,643 B2 | 4/2014 | Pampus et al. | |
| 8,862,321 B2 | 10/2014 | Moshchuk et al. | |
| 9,109,919 B2 * | 8/2015 | Yabe | G01C 21/30 |
| 9,174,674 B2 | 11/2015 | Endo et al. | |

(Continued)

FOREIGN PATENT DOCUMENTS

| | | |
|---|---|---|
| CN | 104615889 A | 5/2015 |
| CN | 107618502 B | 12/2019 |

(Continued)

OTHER PUBLICATIONS

Vázquez-Méndez, Miguel & Casal Urcera, Gerardo. (2016). The Clothoid Computation: A Simple and Efficient Numerical Algorithm. Journal of Surveying Engineering. 142. 04016005:1-9. 10.1061/(ASCE)SU.1943-5428.0000177. (Year: 2016).*

(Continued)

*Primary Examiner* — David P. Merlino
(74) *Attorney, Agent, or Firm* — Billion & Armitage (57) ABSTRACT

A system and method of path planning utilizing a clothoid curve to connect a start point and an end point is provided. The method includes receiving at a path planning system inputs including the start point and the end point of a desired path. The method further includes calculating clothoid parameters for a clothoid curve connecting the start point and the end point based the received start point, the received end point, and a closed-form expression, wherein the closed-form expression is generated based on a relationship between a plurality of unique center point values associated with a plurality of unique clothoid curves and the clothoid parameters associated with each of the plurality of unique clothoid curves. A clothoid curve is generated based on the determined clothoid parameters, wherein the generated clothoid curve represents a planned path from the start point to the end point.

20 Claims, 7 Drawing Sheets

(56) References Cited

U.S. PATENT DOCUMENTS

| | | | |
|---|---|---|---|
| 9,517,766 | B2 | 12/2016 | Nakada et al. |
| 9,746,854 | B2 | 8/2017 | Berkemeier |
| 9,884,646 | B2 | 2/2018 | Tomozawa et al. |
| 10,139,826 | B2 | 11/2018 | Berkemeier |
| 10,144,453 | B2 | 12/2018 | Bunderson et al. |
| 10,203,694 | B2 | 2/2019 | Berkemeier |
| 10,449,969 | B2 | 10/2019 | Harai |
| 10,525,974 | B2 | 1/2020 | Nakada |
| 2003/0101036 | A1* | 5/2003 | Nagel .................. G01C 21/32 703/13 |
| 2008/0170074 | A1* | 7/2008 | Beier .................. G09B 29/102 345/442 |
| 2009/0248299 | A1* | 10/2009 | Fukumoto .......... G01C 21/3626 701/532 |
| 2010/0076684 | A1* | 3/2010 | Schiffmann .......... G01S 13/867 701/301 |
| 2015/0057922 | A1* | 2/2015 | Yabe .................. G01C 21/3626 701/437 |
| 2018/0284769 | A1* | 10/2018 | Wang .................. B62D 1/00 |
| 2019/0033874 | A1 | 1/2019 | Berkemeier |
| 2019/0041858 | A1* | 2/2019 | Bortoff .............. G05D 1/0246 |

FOREIGN PATENT DOCUMENTS

| | | |
|---|---|---|
| EP | 3174775 A1 | 6/2017 |
| EP | 2983964 B1 | 9/2017 |
| EP | 2983965 B1 | 9/2017 |
| JP | 2011046335 A | 3/2011 |
| JP | 2014034230 A | 2/2014 |
| JP | 6511728 B2 | 5/2014 |
| JP | 2019123505 A | 7/2019 |

OTHER PUBLICATIONS

Eliou, Nikolaos; Kaliabetsos, Georgios; A new, simple and accurate transition curve type, for use in road and railway alignment design European Transport Research Review; Heidelberg vol. 6, Iss. 2, (Sep. 2013): 171-179. DOI:10.1007/s12544-013-0119-8 (Year: 2013).*

Gim, S., Adouane, L., Lee, S. et al. Clothoids Composition Method for Smooth Path Generation of Car-Like Vehicle Navigation. J Intell Robot Syst 88, 129-146 (2017). https://doi.org/10.1007/s10846-017-0531-8 (Year: 2017).*

* cited by examiner

SYSTEM AND METHOD FOR PATH PLANNING IN VEHICLES

FIELD

This disclosure is generally directed to autonomous vehicles and more specifically to path planning for autonomous vehicles.

BACKGROUND

As autonomous vehicles become more and more prevalent, a number of issues have been identified. For example, given a current position of a vehicle and a desired position of a vehicle, the problem becomes how to control the vehicle to smoothly move between the respective positions. That is, the transition should be comfortable to passengers within the vehicle. This type of problem is often-times referred to as path planning. The problem becomes particularly difficult when the orientation of the vehicle changes from the current position to the desired position, for example when the car is being parked.

A clothoid or Euler spiral is a type of curve characterized by its curvature being proportional to its length. Clothoids have long been identified as providing the type of smooth transition between points that is a desirable in path planning of autonomous vehicles. However, given a current position of a vehicle and a desired position of a vehicle, it is not computationally possible to generate a clothoid that will generate the desired transition. For example, the position of a point along a clothoid curve is given by the following equations:

$$x[t] = a\sqrt{\pi}\, FresnelS\left[\frac{t}{\sqrt{\pi}}\right]$$

$$y[t] = a\sqrt{\pi}\, FresnelC\left[\frac{t}{\sqrt{\pi}}\right]$$

$$FresnelS[t] = \int_0^t \sin\left[\frac{\pi z^2}{2}\right] dz$$

$$FresnelC[t] = \int_0^t \cos\left[\frac{\pi z^2}{2}\right] dz$$

Given a desired position, it is not possible (or at the very least, extremely computationally expensive) to back solve these equations to determine the parameters (radius R and length L—expressed here as the parameter a) of the clothoid required to connect a start point to an end point.

It would therefore be beneficial to develop a computationally efficient method of generating clothoids to be utilized in path planning of vehicles.

SUMMARY

According to one aspect, a method of planning a path includes receiving at a path planning system inputs including the start point and the end point of a desired path. The method further includes calculating clothoid parameters for a clothoid curve connecting the start point and the end point based the received start point, the received end point, and a closed-form expression, wherein the closed-form expression is generated based on a relationship between a plurality of unique center point values associated with a plurality of unique clothoid curves and the clothoid parameters associated with each of the plurality of unique clothoid curves. A clothoid curve is generated based on the determined clothoid parameters, wherein the generated clothoid curve represents a planned path from the start point to the end point.

According to another aspect, a method of planning a path between a start point and a desired end point using a clothoid curve includes an initialization stage and a path planning stage. During the initialization stage the method includes generating a plurality of unique clothoid curves each defined by a unique combination of clothoid parameters and calculating with respect to each unique clothoid curve a center point value. A curve-fitting technique is applied to the plurality of center point values generated for each of the plurality of unique clothoid curves, wherein the curve-fitting technique provides non-linear polynomials that relates the plurality of center point values to clothoid parameters associated with the plurality of unique clothoid curves. A closed-form expression is generated from the non-linear polynomials, wherein the closed-form expression relates a desired end point position and orientation to a clothoid parameter. The closed-form expression is stored for use during the path planning stage. During the path planning stage, inputs are received indicating the desired start point and the desired end point, wherein the start point and end point are each defined by a position and orientation. Clothoid parameters are calculated for a clothoid curve connecting the start point and the end point based the received start point, the received end point, and the stored closed-form expression. A clothoid curve is generated based on the determined clothoid parameters, wherein the generated clothoid curve represents a planned path from the start point to the end point.

According to another aspect, a path planning system includes an input configured to receive a start point and a desired end point. The path planning system may further include a memory configured to store a closed-form expression, wherein the closed-form expression defines a relationship between clothoid parameters utilized to generate a plurality of unique clothoid curves and a plurality of unique center point values associated with each of the plurality of unique clothoid. The path planning system may further include a processor configured to receive the start point and the desired end point from the input and to execute instructions to solve the closed-form expression based on the received start point and the desired end point to determine parameters of a clothoid curve connecting the start point to the desired end point. The path planning system may further include an output configured to provide the calculated clothoid curve as a path planning output.

DETAILED DESCRIPTION

According to some aspects, the present disclosure provides a system and method of providing computationally inexpensive path planning from a start point to an end point based on clothoid curves. The generation of a clothoid connecting a start point and an end point is typically computationally expensive.

According to some aspects of the present disclosure, a computationally inexpensive system and method of calculating clothoids between a start point and an end point is provided. The method includes an initialization stage in which a plurality of unique clothoid curves are generated— each defined by a unique combination of parameters (e.g., radius R, length L). For each clothoid curve generated the center point of the clothoid curve is calculated and stored. A curve-fitting algorithm is utilized to generate a non-linear polynomial that relates the stored center point information to the parameters utilized to generate the clothoid curves. The non-linear polynomial can be solved and expressed as a closed-form expression that can be solved for parameters of a desired clothoid based on received input information. During a subsequent path planning stage, start point and end point information is received and provided as inputs to the closed-form expression to determine the parameters of a clothoid curve successful in connecting the start point to the end point. During path planning, executing the operations required to solve the closed-form expression and computationally inexpensive and can be done in real-time. In this way, a computationally inexpensive system and method is provided that provides real-time path planning capable of taking advantage of clothoid curves.

Figure 1:
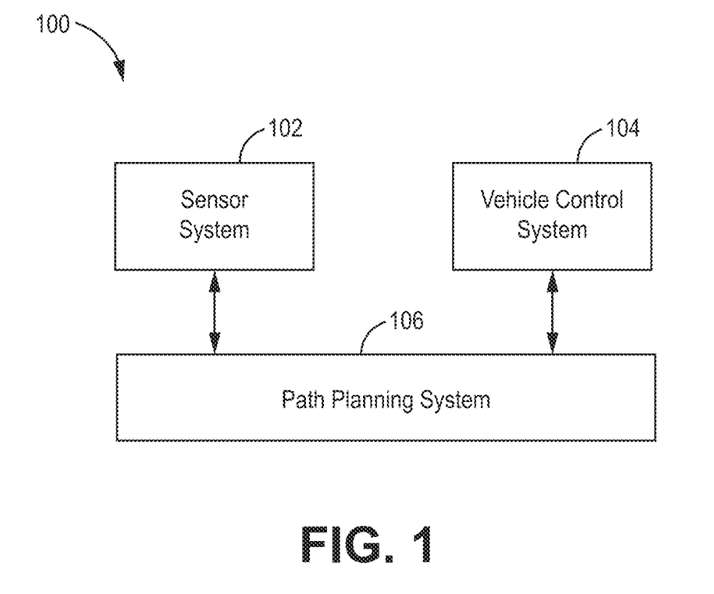
FIG. 1 is a block diagram of an autonomous vehicle control system according to some embodiments.

FIG. 1 is a block diagram of an autonomous vehicle control system 100 according to some embodiments. According to some embodiments, the vehicle control system 100 includes a sensor system 102, a vehicle controls system 104, and a path planning system 106. The sensor system 102 may include a plurality of different sensors and types utilized to gather information regarding the environment surrounding the vehicle. For example, sensors employed may include LiDAR, cameras, radar, ultrasound and others. Sensor system 102 may further include sensors utilized to determine the position, orientation, speed, and acceleration of the vehicle. Based on collected sensor data, the sensor system 102 may provide as outputs the current location of the vehicle and a desired end point of the vehicle. For example, in a parking situation, the vehicle may identify a start point (the current location of the vehicle) and a desired end point (the parking location). The start point and end point may be defined by both a position and vehicle orientation information.

Path planning system 106 receives the start point and end point information from the sensor system 102 (or related system) and utilizes the received information to plan the path of the vehicle. As discussed in more detail below, path planning between a start point and an end point (presumably having a different vehicle orientation than the start point) requires the calculation of a curve connecting the two points. A clothoid or Euler spiral is a type of curve characterized by its curvature being proportional to its length. A benefit of utilizing a clothoid curve to connect a start point to an end point is that the change in steering wheel velocity is comfortable to passengers. As discussed in more detail below, the path planning system 106 provides a computationally inexpensive method of calculating a clothoid to connect a start point with an end point. In particular, during online processing the clothoid is calculated based on the solution of a closed-form expression—that is—an expression expressed in a finite number of standard operations (e.g., addition, subtraction, multiplication, division, exponentials, roots, logarithms, trigonometric functions and inverse hyperbolic functions). The clothoid connecting a start point to an end point is provided as an output representing the desired path of the vehicle. In some embodiments, the path planning output generated by path planning system 106 includes a combination of clothoid curves and arc curves (i.e., a curve having a fixed radius). In some embodiments, arc curves are appended to the end of a clothoid curve as required.

Vehicle control system 104 receives the path planning output (e.g., clothoid curve or clothoid-arc curve) generated by the path planning system 106 and utilizes the planned path to control the vehicle. This may include generating control instructions to control the steering, orientation, speed, and direction of the vehicle to follow the path planning output generated by the path planning system 106. In some embodiments, new input from the sensor system 102 may result in the start point (or end point) being modified and may be utilized by the path planning system 106 to update the path planning output generated.

Figure 2:
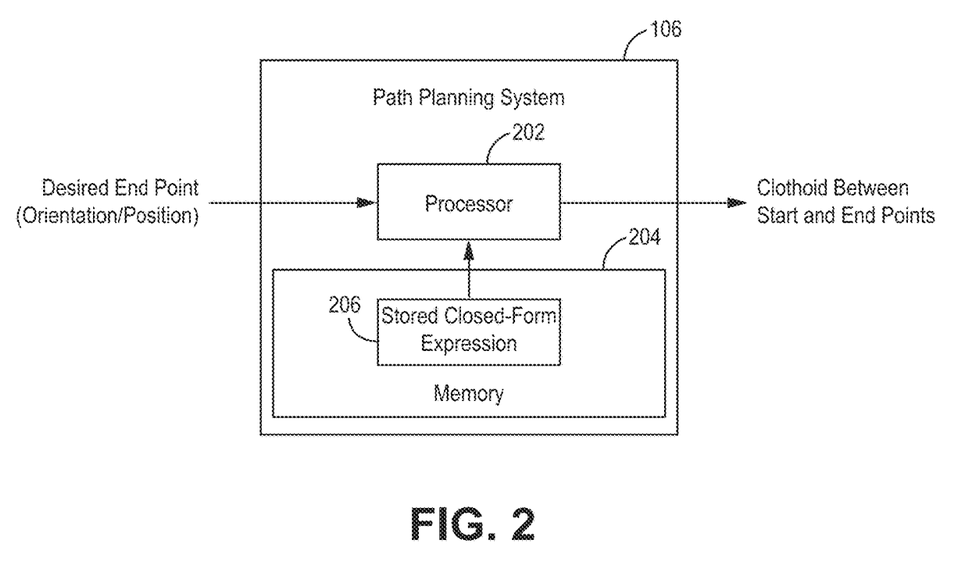
FIG. 2 is a block diagram of a path planning system according to some embodiments.

FIG. 2 is a block diagram of a path planning system according to some embodiments. In the embodiment shown in FIG. 2, path planning system 106 includes a processor 202 and a memory 204. In some embodiments, memory 204 stores instructions executable by the processor 202 to calculate the clothoid curve (or clothoid-arc curve) connecting the start point with the desired end point. As described in more detail below with respect to FIGS. 4 and 5, calculating the clothoid curve that connects the start point and the end point includes solving the closed-form expression 206 stored in memory 204 based on the received start point and end point. As described in more detail with respect to FIG. 3, the closed-form expression 206 is determined via an initialization process. In some embodiments, memory 204 stores instructions for implementing the initialization process to determine the closed-form expression 206. In other embodiments, instructions for implementing the initialization process are stored and executed external to the path planning system 106 and the calculated closed-form expression 206 is subsequently communicated to the path planning system 106 for storage by memory 204.

During operation, the path planning system 106 receives as inputs start point and end point information. Processor 202 executes computer readable instructions stored by memory 204 to calculate the parameters of a clothoid curve or clothoid-arc curve connecting the start point to the end point. In particular, processor 202 utilizes the start point and end point information to solve the closed-form expression 206—the solution to which provides the parameters of a clothoid connecting the start point to the end point. As described below, the closed-form expression can be expressed in a finite number of standard operations (e.g., addition, subtraction, multiplication, division, exponentials, roots, logarithms, trigonometric functions and inverse hyperbolic functions) and is therefore computationally inexpensive to execute in real-time to generate the desired clothoid. In some embodiments, processor 202 provides the parameters of the clothoid as an output. In other embodiments, processor 202 provides the clothoid curve or clothoid-arc curve as an output representing the planned path to be executed by the vehicle control system 104.

Figure 3:
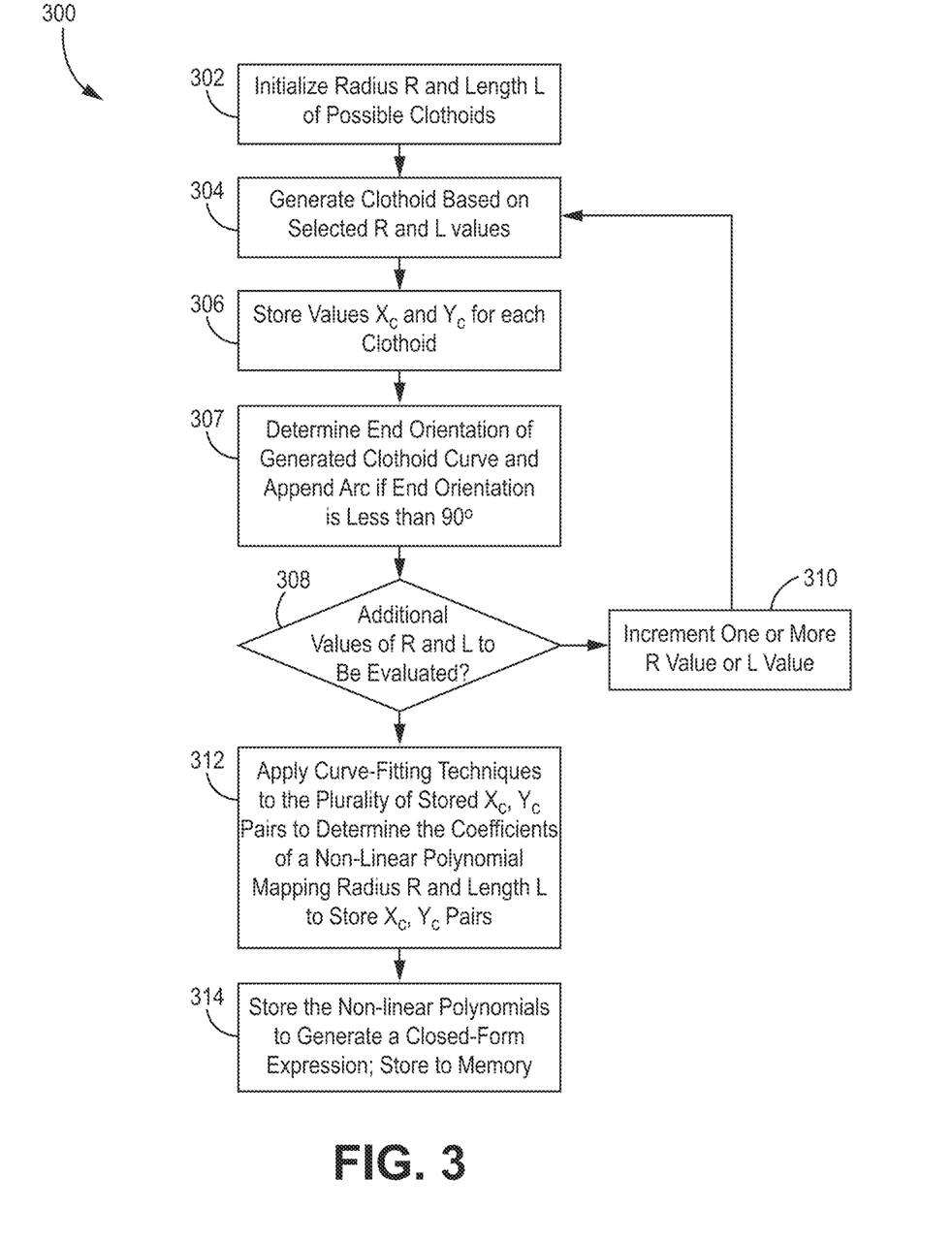
FIG. 3 is a flowchart illustrating offline steps implemented to generate the polynomial coefficients relating the radius R and length L of generated clothoids to stored center point values $x_c$, $y_c$ according to some embodiments.
Figure 4:
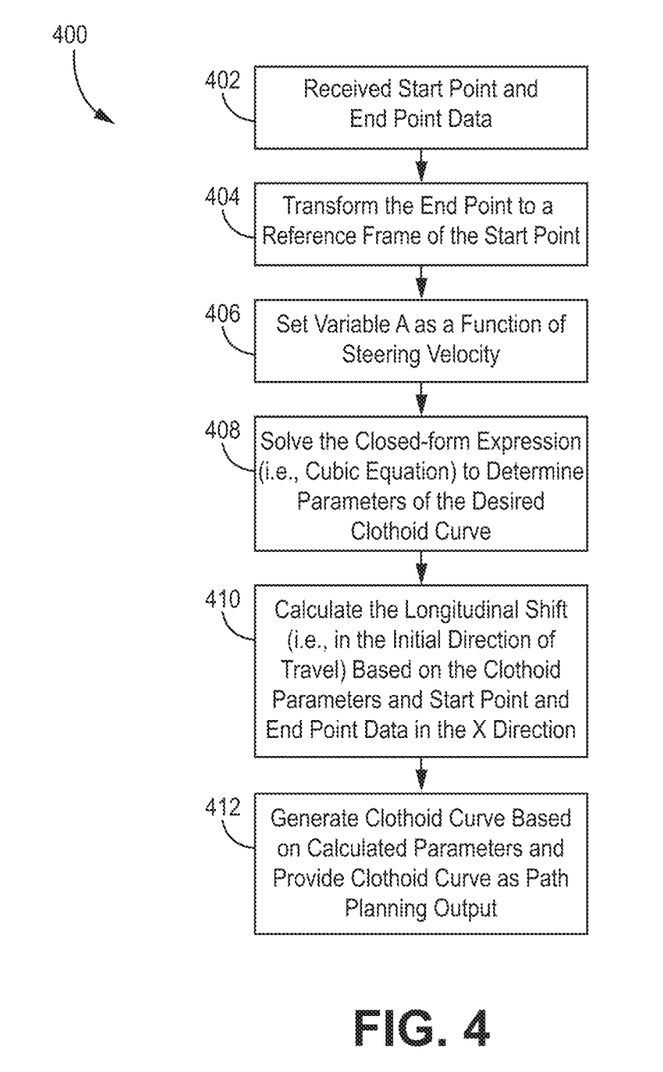
FIG. 4 is a flowchart illustrating steps implemented by the path planning system to calculate a clothoid curve utilized to define the path of a vehicle between a start point and an end point.
Figure 5:
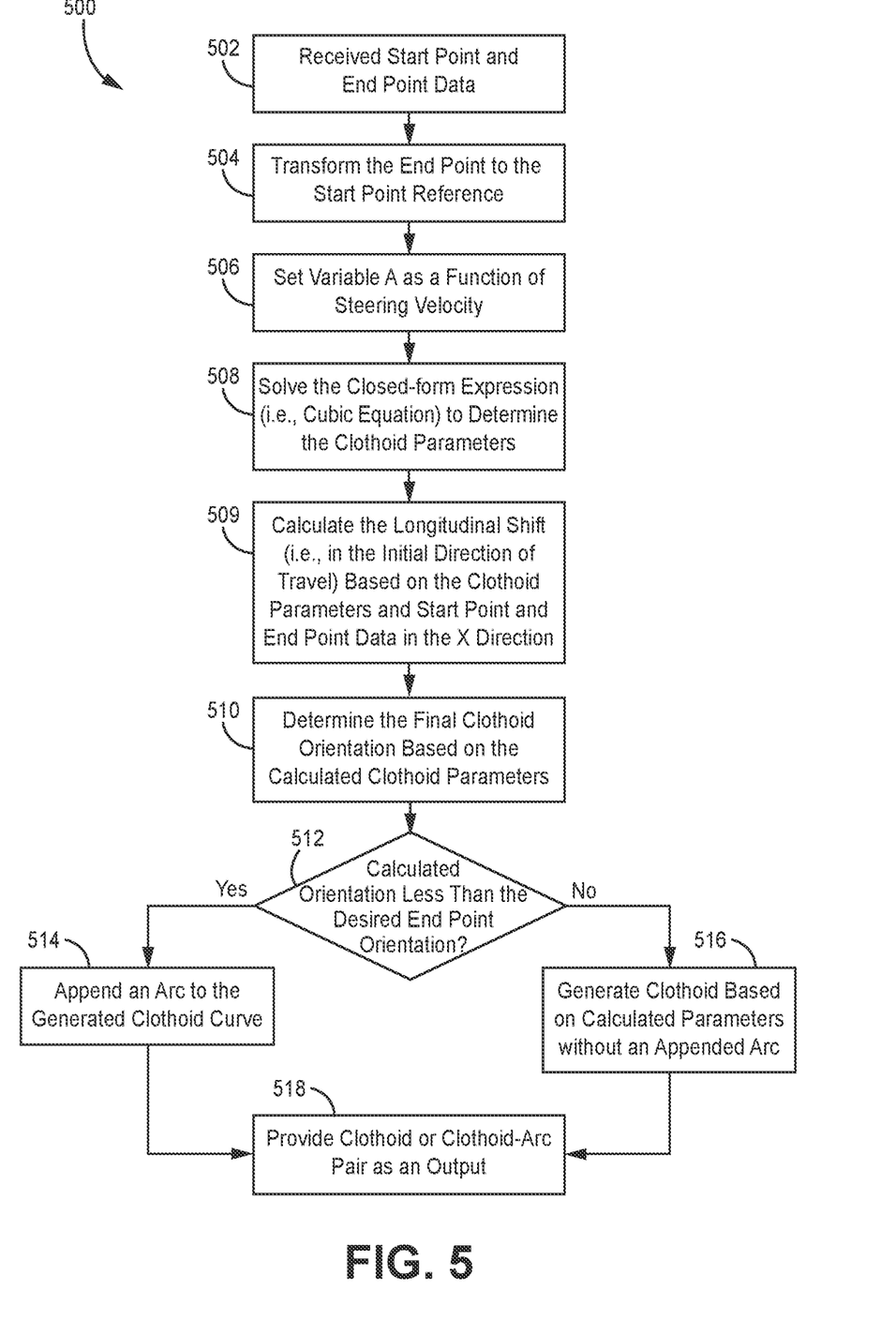
FIG. 5 is a flowchart illustrating steps implemented by the path planning system to calculate a clothoid-arc curve or clothoid curve utilized to define the path of a vehicle between a start point and an end point.

As discussed in more detail below, one of the benefits of this disclosure is that a clothoid curve can be generated in a computationally efficient way based on solving the closed-form expression 206 stored in memory 204. The flowchart described with respect to FIG. 3 illustrates the steps utilized to determine the closed-form expression assigned to a particular vehicle. FIG. 4 illustrates the steps utilized to generate a clothoid path connecting a start point to an end point based on the closed-form expression, and FIG. 5 illustrates steps utilized to determine whether a clothoid-arc curve is required to connect a start point to an end point according to some embodiments.

Referring to FIG. 3, a flowchart 300 illustrates the steps utilized during an initialization stage to generate the closed-form expression stored to memory for subsequent use in calculating clothoid curves. In some embodiments, the method includes generating a plurality of clothoid curves, each clothoid curve defined by a set of unique parameters. Center point information is collected from the plurality of clothoids and curve-fitting algorithms are utilized to relate the parameters (e.g., radius R, length L) of the generated clothoids to the calculated center points $x_c$, $y_c$. As described in more detail below, the polynomial coefficients generated to relate the clothoid parameters to the calculated center points are utilized to generate the closed-form expression stored to memory and utilized subsequently to calculate path planning clothoids connecting a start point to a desired end point. The steps described with respect to FIG. 3 may be performed offline and stored to memory 204 of the path planning system 106 prior to real-time operations (i.e., path planning based on start and end points).

In some embodiments, at step 302 parameters are initialized to begin generating relevant clothoid curves. For example, in some embodiments the parameters include radius R, length L, and parameter A that defines a sharpness factor of the clothoid curve. In some embodiments the parameter A is related to the radius R and length L as follows:

$$A=\sqrt{R*L} \quad (1)$$

In some embodiments, the parameter A is defined as a function of steering velocity, wherein a lower steering velocity provides a more gradual turns and a higher steering velocity provides sharper turns. In some embodiments, the parameter A is selected based, at least in part, on the steering characteristics of the corresponding vehicle. In some embodiments, the parameter A is selected based, at least in part, on input provided by operators of the vehicle regarding desired steering velocity (i.e., tolerance for sharpness of turns).

In some embodiments, the initialization of parameters is based on the attributes of the vehicle in which the clothoid curve generator will be utilized. In some embodiments, the radius R may be initialized based on the minimum turning radius of the vehicle. For example, if the vehicle is characterized by a minimum turning radius of five meters, the minimum radius parameter R may be initialized to five meters.

Figure 6:
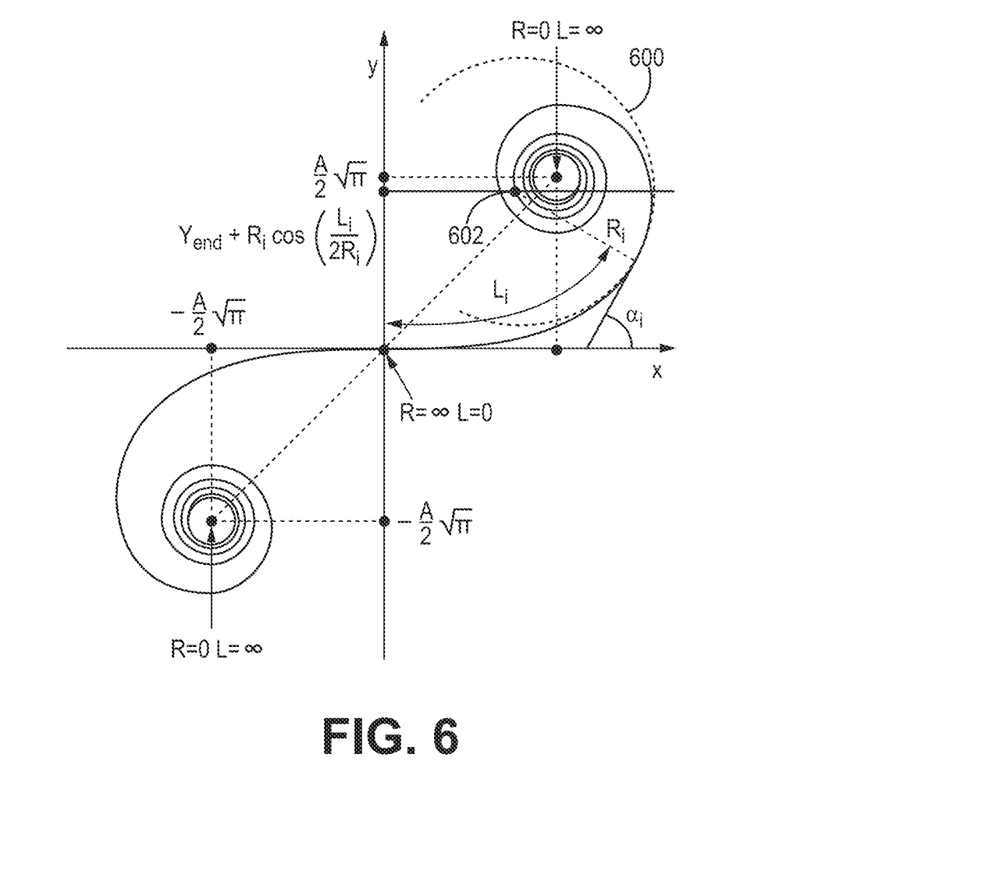
FIG. 6 is a visual representation of a clothoid curve according to some embodiments.

At step 304 a clothoid curve is generated based on the selected parameter values. For reference, FIG. 6 illustrates a sample clothoid. As describe above, the clothoid curve is defined by a curvature that changes linearly with the length of the curve. For example, at length L=0, the radius of the curve is infinite as illustrated by the point located at (0, 0) on the cartesian graph. As the length L of the curve increases, the radius R decreases. As the length L approaches infinity the radius R decreases to zero as defined by the center points located at the center of each spiral. The position of the center point value is given by the following equation:

$$y_c = \frac{A}{2}\sqrt{\pi}, \; x_c = \frac{A}{2}\sqrt{\pi} \quad (2)$$

where $A=\sqrt{R*L}$. In this way, given a clothoid curve defined by known parameters (e.g., radius R and length L), at step 306 the center point of the generated clothoid curve can be calculated relatively simply. In some embodiments, equation (2) is utilized to calculate the center points $x_c$, $y_c$ of the given clothoid curve. In other embodiments, the center points $x_c$, $y_c$ are calculated based on a selected end point of the generated curve $x_{end}$, $y_{end}$ in combination with known clothoid curve parameters as follows:

$$x_c = x_{end} - R*\sin\left(\frac{L}{2R}\right), \; y_c = y_{end} - R*\cos\left(\frac{L}{2R}\right) \quad (3)$$

The center point values $x_c$ and $y_c$ calculated in this manner will vary from the true center point of the clothoid curve as illustrated by the points labeled R=0, L=∞ in FIG. 6, but also account for the possibility of appending arcs to the generated clothoid curve. The center point values calculated using this method are also illustrated in FIG. 6, in which the clothoid curve is assigned a length $L_i$. At the assigned length, the radius $R_i$ can be determined as illustrated by the dashed circle 600 running through point i as shown in FIG. 6. The center of the defined circle 600 defines the center point $x_c$, $y_c$ according to equation (3) (illustrated in FIG. 6 as point 602).

In some embodiments, at step 307 the end point orientation $\psi_{end}$ of the generated clothoid curve is determined using the selected values of clothoid parameters radius R and length L. The end point orientation $\psi_{end}$ of the generated clothoid curve is given by the equation $\psi_{end}$=L/2R, wherein both length L and radius R are known. In some embodiments, if the calculated end point orientation $\psi_{end}$ is less than 90° (i.e., orientation of the end point of the desired path), then an arc is appended to clothoid curve to reach an end point orientation equal to 90°. For example, in the embodiment shown in FIG. 7, each of the plurality of clothoid curves either has an end orientation equal to 90° or has an arc appended to the generated clothoid curve to provide an end orientation equal to 90°. In some embodiments the arc appended to the end of a generated clothoid curve is defined by a radius equal to the radius of the clothoid curve (as calculated at the end of the clothoid) and a center point value that is equal to the center point of the generated clothoid curve. The 90° orientation represents the expected longitudinal axis of a vehicle aligned with a parking space.

Figure 7:
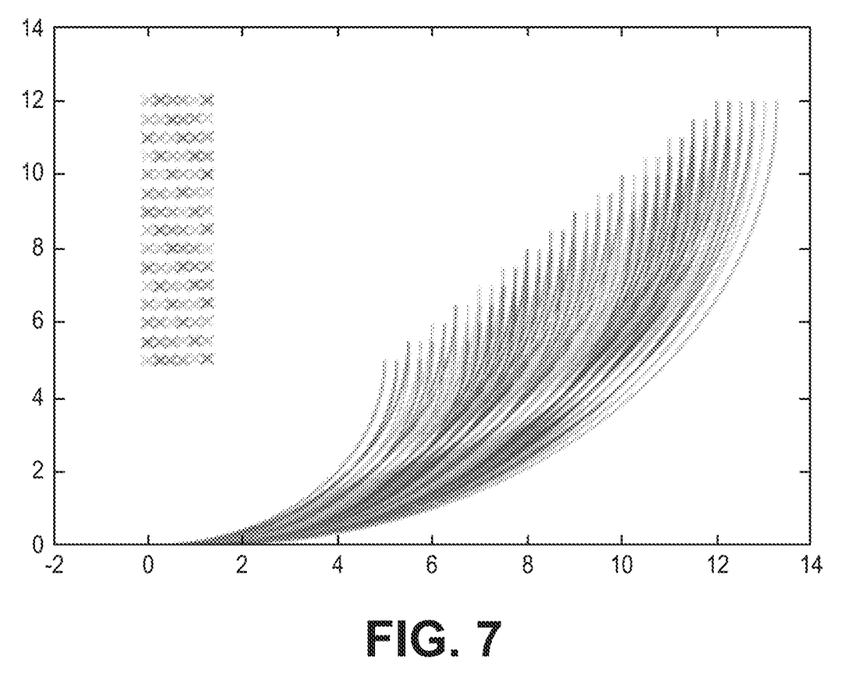
FIG. 7 is a graph illustrating the plurality of clothoid curves generated offline and the corresponding plurality of center point values $x_c$, $y_c$ corresponding with each clothoid curve according to some embodiments.

At step 308, a determination is made regarding whether additional clothoid curves (and/or clothoid-arc curves) should be evaluated. If at step 308 a determination is made that additional clothoid curves defined by different parameters (e.g., radius R, length L) need to be evaluated, then one or more of the parameters are modified at step 310 and the process of generating clothoids and calculating/storing center point values $x_c$, $y_c$ continues. In some embodiments, the modification of the parameters includes increasing one or both of the radius R and length L. For example, in some embodiments the step or increase of each is a constant value (e.g., increasing of each by 0.01 increments). The net result of the loop implemented by steps 304, 306, 308, and 310 is the generation of a plurality of clothoid curves each characterized by a unique set of parameters (e.g., radius R, length L) and a corresponding unique center points $x_c$, $y_c$. An exemplary set of generated clothoid curves each defined by a unique length L and a unique radius R are illustrated in FIG. 7, along with the calculated (and stored) center point values $x_c$, $y_c$ (labeled as a plurality of individual x's).

At step 312 a curve-fitting algorithm is applied to the plurality of stored center point values $x_c$, $y_c$ to fit a non-linear polynomial mapping the plurality of clothoid curve and/or clothoid-arc curves defined by a radius R and length L to the center point values $x_c$ and $y_c$. Any number of curve-fitting algorithms with non-linear optimization may be utilized. The output generated by curve-fitting algorithm includes the coefficients associated with the non-linear polynomial. For example, with respect to the example shown in FIG. 7 the following non-linear polynomials relating the radius R and length L to the center point values $x_c$ and $y_c$ are calculated:

$$x_c = a_1 * R + a_2 * L + a_3 \quad (4)$$

$$y_c = b_5 + b_1 * R + b_2 * L + b_3 * R * L + b_4 * L^2 \quad (5)$$

where $a_1 = 0.0009523$, $a_2 = 0.4969$, $a_3 = 1.718e^{-5}$, $b_1 = 1.003$, $b_2 = 0.02305$, $b_3 = -0.00352$, $b_4 = 0.006413$, and $b_5 = -0.01637$.

At step 314, equations (4) and (5) are solved to generate a closed-form expression that given a start point and end point (i.e., position and orientation) allows the parameters of the clothoid to be determined. In some embodiments, equations (4) and (5) are solved based on assumptions regarding the starting orientation of the vehicle. For example, in some embodiments the starting orientation of the vehicle in the positive x direction and initial travel in the positive x direction relaxes the requirement on the location of the center point value in the x direction. That is, the clothoid curve (and therefore the center point value of the clothoid curve) can be moved in the x direction by recognizing that the vehicle will move in a straight line along the positive x axis for a certain distance before initiating travel along the selected clothoid curve. Based on this assumption, in some embodiments the center point value in the y direction (i.e., perpendicular to an initial direction of travel of the vehicle) is solved first. In some embodiments, equation (5) is solved by using equation (1) from above to replace the length parameter L with the term $A^2/R$, and further utilizing equation (3) from above to replace the unknown center point value $y_c$ with terms related to the end or goal point in the y direction ($Y_g$) and the end or goal orientation ($\psi_g$). In this way, the closed-form expression of equation (5) is given by:

$$R^3(b_1 - \cos(\psi_g)) + R^2(A^2 * b_3 + b_5 - Y_g) + R * A^2 * b_2 + A^4 * b_4 = 0 \quad (6)$$

The closed-form expression provided by equation (6) allows the clothoid curve (or clothoid-arc curve) required to reach the desired end point to be determined. In some embodiments, assuming the parameter A is set equal to one, then equation (6) can be rewritten as:

$$R^3(b_1 - \cos(\psi_g)) + R^2(b_3 + b_5 - Y_g) + R * b_2 + b_4 = 0 \quad (7)$$

In this way, the closed-form expression provided in Equations (6) or (7) relate the desired end point or goal of the vehicle ($Y_g$) and the desired orientation of the vehicle ($\psi_g$) with a parameter of the clothoid—in this instance, radius R. As described in more detail with respect to FIG. 5, Equations (6) and (7) can also be utilized to relate the desired end point or goal of the vehicle ($Y_g$) and the desired orientation of the vehicle ($\psi_g$) with a parameter of the clothoid-arc curve, wherein the radius R is the same for each.

As discussed in more detail below, in some embodiments equation (6) (or equation (7), if A set equal to '1') is generated during the initialization stage—in some embodiments in an offline mode—and stored by the path planning system 106 for use in making real time clothoid calculations. In the example shown here, equation (6) provides the radius R of the clothoid given the start point, end point $Y_g$ and end point orientation $\psi_g$. Having determined the radius R, the other parameters of the clothoid curve can be determined based on the following equation:

$$L = \frac{A^2}{R} \quad (8)$$

wherein as discussed above A is determined based on the desired steering velocity. As discussed above, in some embodiments the value of A is a fixed value—for example based on the model of the vehicle. In other embodiments the value of A may be modified—for example by a user based on user preference for steering velocity. In some embodiments the value of A may be modified during operation (i.e., that is, selectively increased or decreased by the operator).

Referring now to FIG. 4, the method for calculating a clothoid curve that connects a start point and an end point is described.

At step 402, start point and end point information is received. Start point and end point information includes the desired position and orientation of the vehicle at the start point and the end point. For purposes of this description, it is assumed that the orientation of the start point is provided in the positive x direction, and therefore only the orientation of the end point relative to the start point is needed, wherein the orientation of the endpoint is provided here as θ.

At step 404, the end point is transformed to a reference frame of the start point. For example, in some embodiments, the start point is assigned a position of [0, 0, 0] in a cartesian (x, y, θ) coordinate system. As described above, the orientation of the start point is assumed to be in the positive x direction. The end point is assigned a position of $[x_g, y_g, \psi_g]$.

At step 406, a variable A is selected based on the desired steering velocity of the vehicle. As discussed above, in some embodiments, A is a predetermined value. In some embodiments, the value is predetermined based in part on the vehicle. In some embodiments, A may be selected based on user preference, and may be modified by the user based on desired user comfort. In general, increasing A decreases the maximum steering velocity, resulting in more gradual turns. Conversely, decreasing A increases the maximum steering velocity, resulting in more sharp turns.

At step 408, the end point position $y_g$ and orientation $\psi_g$ are provided as inputs to the closed-form expression (such as, for example, the exemplary closed-form expression given in equation (6)) to determine the parameters of the desired clothoid curve. For example, with respect to the closed-form expression provided by equation (6) and given that the constants $b_1$, $b_2$, $b_3$, $b_4$, and $b_5$ are known, the radius R of the desired clothoid curve can be determined.

To emphasize the computational efficiency of the above method, the following single line of code can be utilized to calculate the radius R of the desired clothoid given a start point and an end point, wherein variables are defined by the characters 'A', 'B', 'C', 'D', T', 'Q', and 'R', wherein the radius of the clothoid is given by 'finalR'. This single line of code comprises relatively simple mathematical functions that is computationally efficient to execute.

$$A = (b1 - \cos(psig));$$
$$B = (b5 + b3 - Yg);$$
$$C = b2;$$
$$D = b4;$$
$$P = -B/(3*A);$$
$$Q = (P^\wedge 3) + ((B*C - 3*A*D)/(6*A*A));$$
$$R = C/(3*A);$$

$$finalR = \text{real}\left(\left(Q + (Q^\wedge 2 + (R - P^\wedge 2)^\wedge 3)^\wedge \left(\frac{1}{2}\right)\right)^\wedge \left(\frac{1}{3}\right) + \left(Q - (Q^\wedge 2 + (R - P^\wedge 2)^\wedge 3)^\wedge \left(\frac{1}{2}\right)\right)^\wedge \left(\frac{1}{3}\right) + P;$$

At step 408 the parameters of the clothoid curve are determined based on the end point position $y_g$ defined in a direction perpendicular to the initial direction of travel of the vehicle. To account for the desired end point position $x_g$, it is assumed that the clothoid curve can be shifted in the positive x direction by desired amount. That is, it is assumed that the vehicle can essentially drive in a straight line in the positive x direction for certain distance before initiating the clothoid curve as defined by the parameters calculated at step 408. At step 410 the longitudinal shift is calculated based on the parameters of the clothoid curve calculated at step 408 and the desired end point position of the vehicle in the x direction. The longitudinal shift of the clothoid curve is given by the following equation:

$$\text{Clothoid\_shift} = x_g - x_{end} \quad (9)$$

wherein $x_g$ is the end point position in the x direction and $x_{end}$ is the end of the clothoid curve based on the parameters calculated at step 408. In some embodiments, the value of $x_{end}$ can be determined as described above with respect to equation (3), rewritten in terms of $x_{end}$ as to provide:

$$x_{end} = x_c + R*\sin(\psi_g) \quad (10)$$

wherein the term $x_c$ is calculated based on the parameters of the calculated clothoid curve using equation (4), (i.e., $x_c = a_1*R + a_2*L + a_3$). With this information, equation (9) can be solved to determine the translation in the x direction of the clothoid curve. In some embodiments, the translation in the x direction is expressed as:

$$\text{clothiod}_{shift} = x_g - ((a_1*R + a_2*L + a_3) + R*\sin(\varphi_g)) \quad (11)$$

At step 412 a clothoid curve is generated based on the parameters R and L calculated at step 408 and the clothoid shift calculated at step 410. The clothoid shift represents the length of travel in the positive x direction—essentially a straight line that should be traveled until initiating the turn to follow the generated clothoid curve. The combination of the clothoid curve and the clothoid shift are provided as an output representing the planned path of the vehicle that connects the start point of the vehicle with the desired end point of the vehicle. As described above, the closed-form expression given by equation (6) (as well as equation (11)) is computationally inexpensive to solve and can be performed in real-time. In this way, given a start point and an end point (and orientation), path planning system 106 is capable of generating a planned path that utilizes the geometry of a clothoid curve.

Referring now to FIG. 5, a method for calculating a combined clothoid curve-arc curve to connect a start point and an end point is described. Many of the steps shown in FIG. 5 are the same as those described with respect to FIG. 4, above.

For example, the method start at step 502 with the receipt of start point and end point data. As described above the start point and end point data may include both orientation and position.

At step 504, the end point is transformed to the reference frame of the start point, wherein the start point is assigned a position of [0, 0, 0]. At step 506, the variable A is set to a desired value as a function of the steering velocity.

At step 508 the closed-form expression (i.e., cubic equation) is solved to determine parameters of the clothoid—including radius R and length L. At step 509 the clothoid shift is calculated based on the clothoid parameters, start point, and end point information. At step 510, the parameters of the clothoid calculated at step 508 are utilized to determine the final clothoid orientation. For example, in some embodiments, the final orientation of the clothoid is given by the following equation:

$$\psi_c = \frac{L}{2R} \quad (9)$$

At step 512, a determination is made whether the calculated orientation $\psi_c$ is less than the desired end point orientation $\psi_g$ (wherein the desired end point in the y-direction will also be less than desired). If the calculated orientation $\psi_c$ is less than the desired end point orientation $\psi_g$ then at step 514 an arc is appended onto the end of the clothoid curve. In some embodiments, the arc appended to the clothoid curve is defined by a radius $R_{arc}$ matching the radius R of the clothoid at the terminus or end of the clothoid. In some embodiments, the arc appended to the clothoid curve is centered on the calculated center points $x_c$, $y_c$, and is further defined by an arclength having an angle equal to the difference between the end of the clothoid (i.e., L/2R or $\psi_c$) and the goal or end point orientation. In this way, an arc is appended to the clothoid curve to provide the desired position and orientation of the end point.

If at step 512 a determination is made that the calculated orientation $\psi_c$ is not less than the desired end point orientation $\psi_g$, then at step 516 the clothoid curve is generated based on the calculated parameters without requiring the appendage of an arc curve to the end of the clothoid.

At step 518 the clothoid-arc pair generated at step 518 or the clothoid generated at step 520 is provided as an output representing the planned path between the given start point and the desired end point. The output—whether a clothoid curve or combination clothoid-arc curve—is provided as an output representing the planned path of the vehicle.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodi- Discussion of Possible Embodiments The following are non-exclusive descriptions of possible embodiments of the present invention.

According to one aspect, a method of planning a path includes receiving at a path planning system inputs including the start point and the end point of a desired path. The method further includes calculating clothoid parameters for a clothoid curve connecting the start point and the end point based the received start point, the received end point, and a closed-form expression, wherein the closed-form expression is generated based on a relationship between a plurality of unique center point values associated with a plurality of unique clothoid curves and the clothoid parameters associated with each of the plurality of unique clothoid curves. A clothoid curve is generated based on the determined clothoid parameters, wherein the generated clothoid curve represents a planned path from the start point to the end point.

The method of the preceding paragraph can optionally include, additionally and/or alternatively any, one or more of the following features, configurations and/or additional components.

For example, in some embodiments the method may further include wherein the received end point includes a position and an orientation relative to the orientation of the start point.

In some embodiments, the method may further include transforming the received start point and the received end point to a common reference frame.

In some embodiments, transforming the received start point and the received end point to a common reference frame may include setting the received start point to a value of [0, 0, 0] and defining the received end point relative to the start point In some embodiments, the relationship between the plurality of unique center point values calculated and clothoid parameters associated with each of the plurality of unique clothoid curves may be representative by a non-linear polynomial that describes a best fit relationship between the plurality of unique center point values to the clothoid parameters utilized to generate the plurality of unique clothoid curves.

In some embodiments, the method may further include defining a clothoid parameter A based on a function of a desired steering velocity.

In some embodiments, a solution to the closed-form expression may provide as a solution the clothoid parameter related to a radius R of the desired clothoid curve.

In some embodiments, the radius R and the clothoid parameter A are utilized to determine the clothoid parameter related to a length L of the desired clothoid curve.

In some embodiments, generating the clothoid curve based on the determine clothoid parameters may include generating the clothoid curve based on the clothoid parameters A, radius R, and length L.

In some embodiments, the method may further include calculating a clothoid shift in a direction of initial travel based on the calculated clothoid parameters and start point and end point data.

In some embodiments, the planned path includes the clothoid curve appended to the clothoid shift.

In some embodiments, the method further includes determining an orientation of a terminus of the calculated clothoid curve based on the calculated clothoid parameters and determining if the orientation of the terminus of the calculated clothoid curve is less than the orientation of the end point. In the event the orientation of the terminus of the calculated clothoid curve is less than the orientation of the end point then the method further includes appending an arc to the calculated clothoid curve.

In some embodiments, the arc appended to the clothoid curve is defined by a radius equal to a radius of the clothoid at the terminus of the clothoid curve.

According to another aspect, a method of planning a path between a start point and a desired end point using a clothoid curve includes an initialization stage and a path planning stage. During the initialization stage the method includes generating a plurality of unique clothoid curves each defined by a unique combination of clothoid parameters and calculating with respect to each unique clothoid curve a center point value. A curve-fitting technique is applied to the plurality of center point values generated for each of the plurality of unique clothoid curves, wherein the curve-fitting technique provides non-linear polynomials that relates the plurality of center point values to clothoid parameters associated with the plurality of unique clothoid curves. A closed-form expression is generated from the non-linear polynomials, wherein the closed-form expression relates a desired end point position and orientation to a clothoid parameter. The closed-form expression is stored for use during the path planning stage. During the path planning stage, inputs are received indicating the desired start point and the desired end point, wherein the start point and end point are each defined by a position and orientation. Clothoid parameters are calculated for a clothoid curve connecting the start point and the end point based the received start point, the received end point, and the stored closed-form expression. A clothoid curve is generated based on the determined clothoid parameters, wherein the generated clothoid curve represents a planned path from the start point to the end point.

The method of the preceding paragraph can optionally include, additionally and/or alternatively any, one or more of the following features, configurations and/or additional components.

For example, in some embodiments the step of calculating a center point value with respect to each unique clothoid may be based on the following equation:

$$x_c = x_{end} - R * \sin\left(\frac{L}{2R}\right) \text{ and}$$

$$y_c = y_{end} - R * \cos\left(\frac{L}{2R}\right),$$

wherein $x_c$ and $y_c$ are the center point values, $x_{end}$ and $y_{end}$ represent an end position of a unique clothoid, L is a length of the unique clothoid, and R is a radius of the unique clothoid.

In some embodiments, the step of generating the closed-form expression may include translating the center point values $x_c$, $y_c$ to values representing the desired end point position and orientation.

In some embodiments, the method may further include determining a final orientation of a calculated clothoid curve based on the calculated clothoid parameters and determining if the final orientation of the calculated clothoid curve is less than the orientation of the end point. If the orientation of the terminus of the calculated clothoid curve is less than the orientation of the end point then an arc is appended to the calculated clothoid curve.

According to another aspect, a path planning system includes an input configured to receive a start point and a desired end point. The path planning system may further include a memory configured to store a closed-form expression, wherein the closed-form expression defines a relationship between clothoid parameters utilized to generate a plurality of unique clothoid curves and a plurality of unique center point values associated with each of the plurality of unique clothoid. The path planning system may further include a processor configured to receive the start point and the desired end point from the input and to execute instructions to solve the closed-form expression based on the received start point and the desired end point to determine parameters of a clothoid curve connecting the start point to the desired end point. The path planning system may further include an output configured to provide the calculated clothoid curve as a path planning output.

The system of the preceding paragraph can optionally include, additionally and/or alternatively any, one or more of the following features, configurations, and/or additional components.

For example, in some embodiments the curve-fitting technique may generate a first polynomial relating the radius R and the length L of each clothoid to a center point value $x_c$ and a second polynomial relating the radius R and the length L of each clothoid to a center point value $y_c$.

In some embodiments, the processor may determine whether an orientation of a terminus of the calculated clothoid curve is less than the orientation of the desired end point, wherein an arc is appended to the terminus of the calculated clothoid curve if the orientation of the terminus of the calculated clothoid curve is less than the orientation of the end point.

The invention claimed is:

1. A path planning method comprising:
   receiving at a path planning system inputs including a start point and an end point of a desired path;
   calculating clothoid parameters for a clothoid curve connecting the start point and the end point, the calculated clothoid parameters based on the start point, the end point, and a closed-form expression, wherein the closed-form expression is generated during an initialization stage comprising:
   generating a plurality of calibration clothoid curves;
   calculating a center point for each of the calibration clothoid curves,
   calculating calibration-clothoid parameters for each of the calibration clothoid curves; and
   calculating the closed-form expression based on the relationship between the center point of each of the calibration clothoid curves and the calibration-clothoid parameters for each of the calibration clothoid curves;
   generating the clothoid curve based on the calculated clothoid parameters, wherein the generated clothoid curve represents a planned path from the start point to the end point; and
   utilizing the generated clothiod curve to control movement of a vehicle between the start point and the end point of the desired path.

2. The method of claim 1, wherein the end point includes a position and an orientation relative to an orientation of the start point.

3. The method of claim 2, further including:
   determining an orientation of a terminus of the generated clothoid curve based on the calculated clothoid parameters;
   determining if the orientation of the terminus of the generated clothoid curve is less than the orientation of the end point of the desired path; and
   appending an arc to the generated clothoid curve if the orientation of the terminus of the calculated clothoid curve is less than the orientation of the end point of the desired path.

4. The method of claim 3, wherein the arc is defined by a radius equal to a radius of a clothoid at the terminus of the generated clothoid curve.

5. The method of claim 1, further comprising:
   transforming the start point and the end point to a common reference frame.

6. The method of claim 5, wherein transforming the start point and the end point to the common reference frame includes setting the start point to a value of [0, 0, 0] and defining the end point relative to the start point.

7. The method of claim 1, wherein the relationship between the center point of each of the calibration clothoid curves and the calibration-clothoid parameters for each of the calibration clothoid curves is a non-linear polynomial that describes a best fit relationship between the center point of each of the plurality of calibration clothoid curves and the calibration-clothoid parameters utilized to generate the plurality of calibration clothoid curves.

8. The method of claim 1, further including defining a clothoid parameter A based on a function of a desired steering velocity.

9. The method of claim 8, wherein a solution to the closed-form expression provides as a solution the clothoid parameter A related to a radius R of the generated clothoid curve.

10. The method of claim 9, wherein the radius R and the clothoid parameter A are utilized to determine a length L of the generated clothoid curve.

11. The method of claim 10, wherein generating the clothoid curve based on the calculated clothoid parameters includes generating the clothoid curve based on the clothoid parameter A, radius R, and length L.

12. The method of claim 1, further including calculating a clothoid shift in a direction of initial travel based on the calculated clothoid parameters and start point and end point data.

13. A method of path planning between a start point and an end point using a clothoid curve, the method comprising:
   during an initialization stage:
   generating a plurality of unique clothoid curves each defined by a unique combination of clothoid parameters and calculating with respect to each unique clothoid curve a center point value;
   applying a curve-fitting technique to the plurality of center point values generated for each of the plurality of unique clothoid curves, wherein the curve-fitting technique provides non-linear polynomials that relates the plurality of center point values to the clothoid parameters associated with the plurality of unique clothoid curves;
   generating a closed-form expression from the non-linear polynomials, wherein the closed-form expression relates an end point position and an end point orientation to a clothoid parameter; and
   storing the closed-form expression;

during a path planning stage:
receiving as an input the start point and the end point, wherein the start point and end point are each defined by a position and an orientation;
calculating the clothoid parameters for the clothoid curve connecting the start point and the end point, the clothoid parameters based on the start point, the end point, and the stored closed-form expression;
generating the clothoid curve based on the calculated clothoid parameters, wherein the generated clothoid curve represents a planned path from the start point to the end point; and
utilizing the generated clothoid curve to control movement of a vehicle between the start point and the end point.

14. The method of claim 13, wherein calculating center point values $(x_c, y_c)$ with respect to each of the plurality of unique clothoid curves is based on the following equation:

$$x_c = x_{end} - R * \sin\left(\frac{L}{2R}\right) \text{ and } y_c = y_{end} - R * \cos\left(\frac{L}{2R}\right),$$

wherein points $(x_c, y_c)$ are center point values, and points $(x_{end}, y_{end})$ represent an end position of a unique clothoid, L is a length of the unique clothoid, and R is a radius of the unique clothoid.

15. The method of claim 13, wherein generating the closed-form expression includes translating the center point values $(x_c, y_c)$ to values representing the end point position and the end point orientation.

16. The method of claim 13, wherein generating the plurality of unique clothoid curves includes appending an arc to a terminus of each unique clothoid curve if the orientation of an end point of the unique clothoid curve is less than 90°, wherein an end point of the appended arc has an orientation of 90°.

17. The method of claim 13, further including:
determining an orientation of a terminus of the generated clothoid curve based on the calculated clothoid parameters;
determining if the orientation of the terminus of the generated clothoid curve is less than the orientation of the end point; and
appending an arc to the terminus of the generated clothoid curve if the orientation of the terminus of the calculated clothoid curve is less than the orientation of the end point.

18. A path planning system comprising:
an input terminal configured to receive a start point and a desired end point;
a memory configured to store a closed-form expression, wherein the closed-form expression defines a relationship between clothoid parameters utilized to generate a plurality of unique clothoid curves and a plurality of unique center point values associated with each of the plurality of unique clothoid curves;
a processor configured to receive the start point and the desired end point from the input terminal and to execute instructions to solve the closed-form expression based on the received start point and the desired end point to determine parameters of a clothoid curve connecting the start point to the desired end point; and
an output terminal configured to provide the clothoid curve as a path planning output to a vehicle control system, which utilizes the clothoid curve to control movement of a vehicle between the start point and the desired end point.

19. The path planning system of claim 18, wherein a curve-fitting technique generates a first polynomial relating a radius R and a length L of each of the unique clothoid curves to a center point value $x_c$, and a second polynomial relating the radius R and the length L of each of the unique clothoid curves to a center point value $y_c$.

20. The path planning system of claim 19, wherein the processor determines whether an orientation of a terminus of the clothoid curve is less than an orientation of the desired end point, wherein an arc is appended to the terminus of the clothoid curve if the orientation of the terminus of the clothoid curve is less than the orientation of the end point.

\* \* \* \* \*